United States Patent [19]
Sato et al.

[11] Patent Number: 5,122,638
[45] Date of Patent: Jun. 16, 1992

[54] OPTICAL FIBER FUSION SPLICER

[75] Inventors: Katsuo Sato, Inba; Koji Ozawa; Isao Suzuki, both of Sakura; Mikio Yoshi-numa, Yachiyo, all of Japan

[73] Assignee: Fujikura Ltd., Tokyo, Japan

[21] Appl. No.: 759,439

[22] Filed: Sep. 13, 1991

[51] Int. Cl.$^5$ .............................................. H05B 7/18
[52] U.S. Cl. ...................................... 219/383; 385/95; 385/96; 65/4.1
[58] Field of Search ................. 385/95, 96; 219/86.51, 219/383; 65/4.1, 4.2

[56]  References Cited
U.S. PATENT DOCUMENTS 4,708,426  11/1987  Khoe ................................. 385/96 X
5,002,351   3/1991  Szanto et al. ........................ 385/96

Primary Examiner—John D. Lee
Assistant Examiner—Stephen W. Barns
Attorney, Agent, or Firm—Cushman, Darby & Cushman

[57] ABSTRACT

An optical fiber fusion splicer includes a discharge unit for producing an electric discharge to fusion splice optical fibers and a pressure sensor for producing a pressure detection signal representing the surrounding atmospheric pressure. In response to the pressure detection signal the discharge is controlled by a control unit so that a substantially optimum discharge current for the fusion splicing is provided to the discharge unit. The discharge control unit includes an adjusting unit for producing a discharge current adjusting signal, a control signal generating unit for generating a control signal on the basis of both the pressure detection signal and the discharge current adjusting signal, and a discharge current control unit for controlling the discharge current in response to the control signal.

5 Claims, 7 Drawing Sheets

OPTICAL FIBER FUSION SPLICER

BACKGROUND OF THE INVENTION

The present invention relates to an optical fiber fusion splicer which performs fusion splicing of optical fibers using an arc discharge.

To reduce a splice loss in fusion splicing of optical fibers by the optical fiber fusion splicer it is important to optimize the amount of heat applied to the optical fibers. In the optical fiber fusion splicer which utilizes discharge heating, there is provided a function to set the amount of heating by adjusting the discharge current.

As shown in FIG. 4, the optimal discharge current in the optical fiber fusion splicer varies as the atmospheric pressure changes. It is necessary to increase the discharge current in inverse proportion to the atmospheric pressure.

When optical fibers are fusion spliced at low atmospheric pressure in mountains it is necessary to read the optimal discharge current from such a graph as shown in FIG. 4 and to manually adjust the discharge current to correspond to the optimum discharge current.

However, it is very inconvenient to manually adjust the discharge current every time when the atmospheric pressure changes.

SUMMARY OF THE INVENTION

Accordingly, it is an object of the present invention to provide an optical fiber fusion splicer which is capable of automatically setting an optimal discharge current which is given according to the atmospheric pressure.

In view of this and other objects the present invention provides an optical fiber fusion splicer comprising: discharge means for producing an electric discharge to fusion splice optical fibers; a pressure sensor for producing a pressure detection signal representing the surrounding atmospheric pressure; and discharge control means for controlling the discharge in response to the pressure detection signal so that a substantially optimum discharge current for the fusion splicing is provided to the discharge means, the discharge control means including: adjusting means for producing a discharge current adjusting signal; control signal generating means for generating a control signal on the basis of both the pressure detection signal and the discharge current adjusting signal; and discharge current control means for controlling the discharge current in response to the control signal.

DETAILED DESCRIPTION OF THE PREFERRED EMBODIMENTS

Referring to FIGS. 1 to 4, one embodiment of the present invention will be described.

Figure 1:
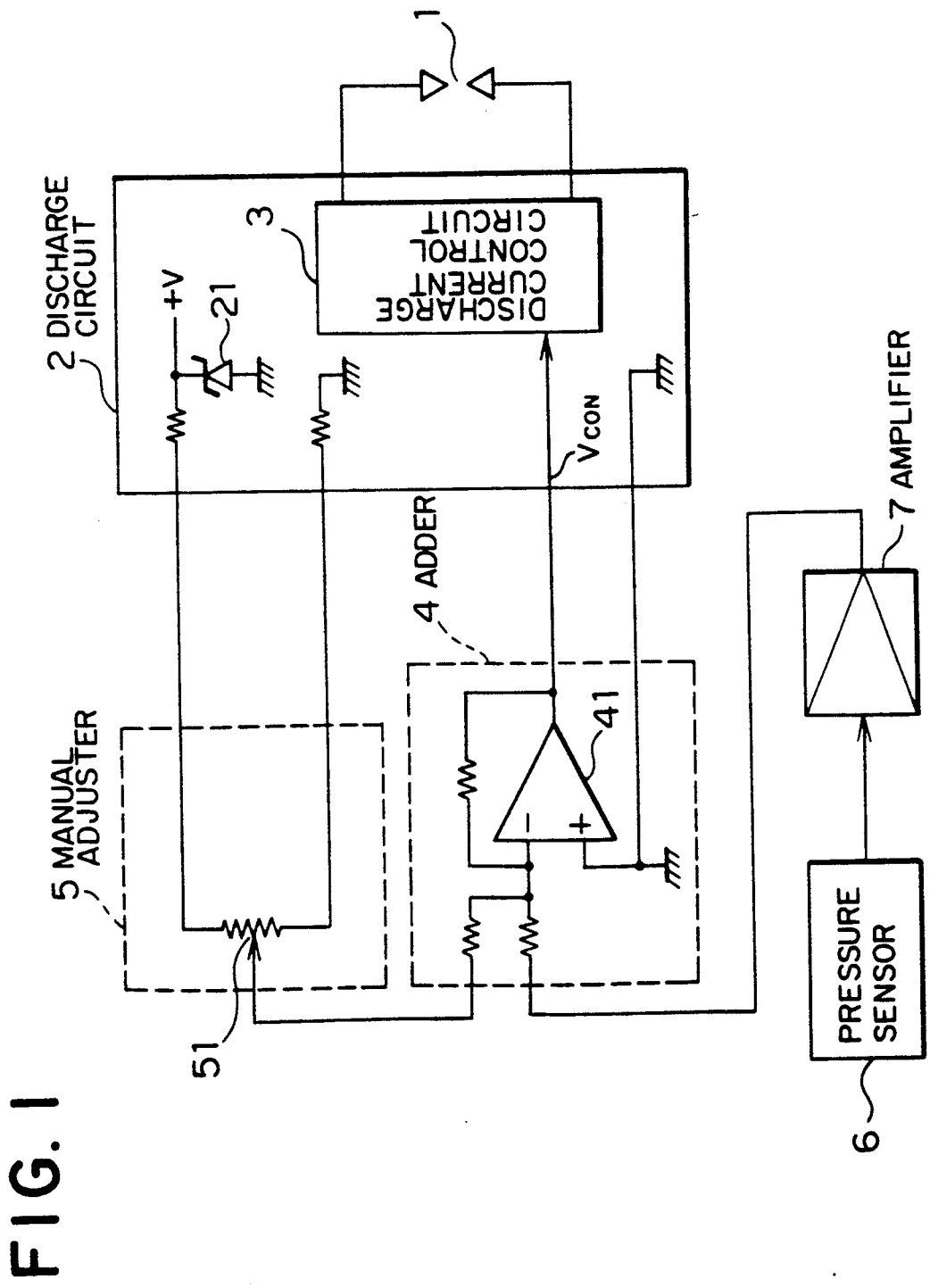
FIG. 1 is a block diagram illustrating an optical fiber fusion splicer according to the present invention.

In FIG. 1, discharge electrodes 1 and 1 are connected to a discharge circuit 2 for supplying a discharge current. The discharge circuit 2 includes a discharge current control circuit 3 which controls the discharge current according to a control voltage Vcon. The control voltage Vcon is provided from an adder 4, which includes an operation amplifier 41. A manually set voltage is applied from a manual adjuster 5 to the operation amplifier 41. An output of a pressure sensor 6 is amplified by an amplifier 7 and is then also sent to the operation amplifier 41. These voltages are added to apply as the control voltage Vcon to the discharge current control circuit 3. The manual adjuster 5 consists of a manually adjustable variable resistor 51. The variable resistor 51 provides a manually set voltage by dividing a voltage which has been produced by regulating a DC voltage V by a voltage regulation diode 21, the DC voltage V being supplied from a power supply circuit (not shown). As the pressure sensor 6, use may be made of a semiconductor pressure sensor utilizing piezoelectric effect of silicon. The output voltage of the pressure sensor 6 is amplified by the amplifier 7 to an appropriate level.

Figure 2:
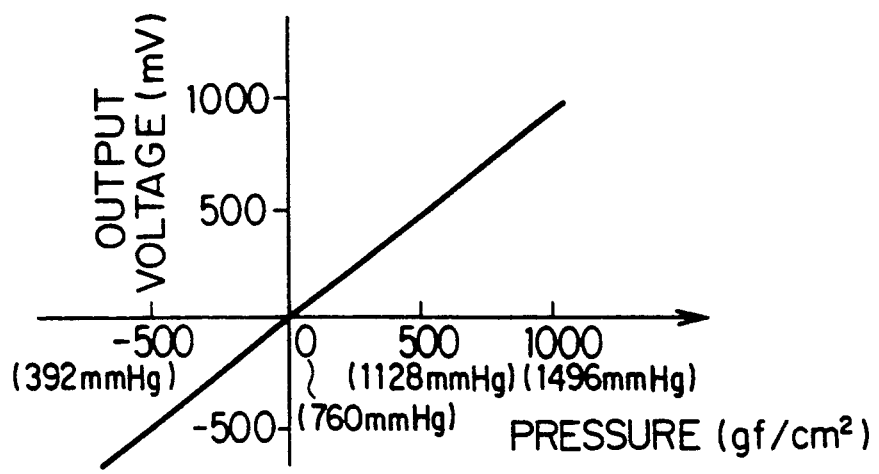
FIG. 2 is a graph showing an output voltage characteristic of the pressure sensor of FIG. 1.
Figure 3:
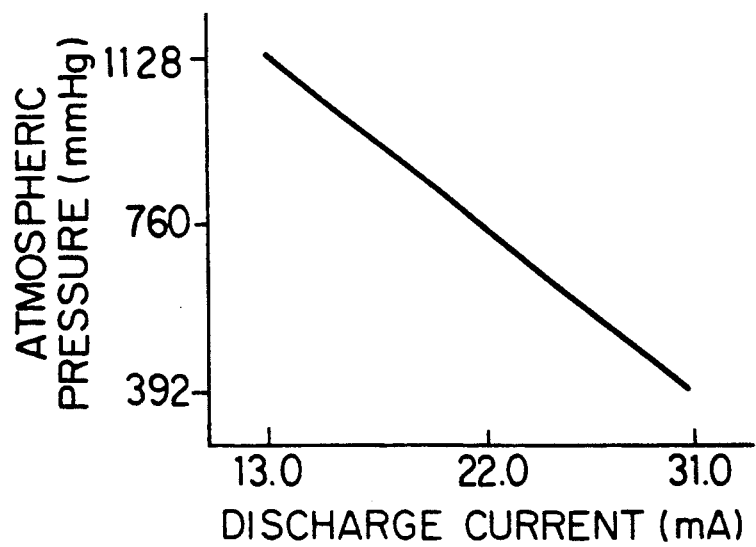
FIG. 3 is a graph illustrating a relationship between the atmospheric pressure and the discharge current in the optical fiber fusion splicer in FIG. 1.
Figure 4:
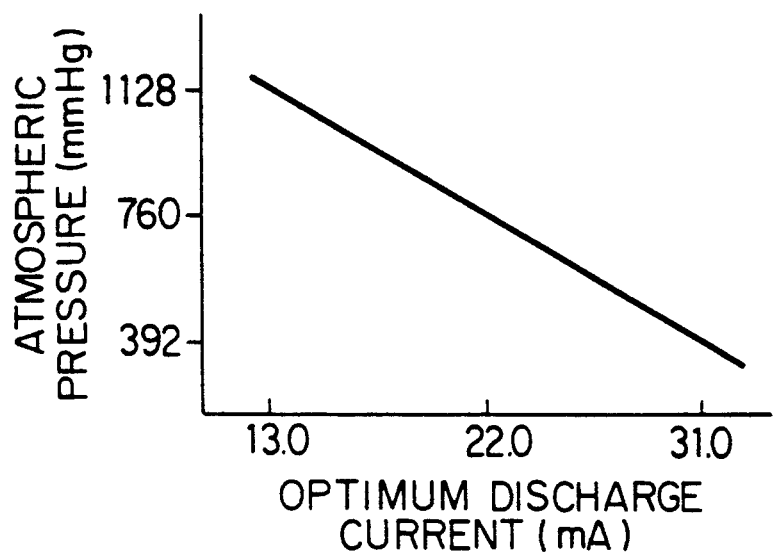
FIG. 4 is a graph illustrating a relationship between the atmospheric pressure and the optimum discharge current in the optical fiber fusion splicer in FIG. 1.

The discharge current control circuit 3 has a characteristic such that the lower the control voltage Vcon is the larger discharge current thereof becomes. The pressure vs output voltage characteristic of the pressure sensor 6 is shown in FIG. 2. As the pressure increases, the output voltage rises. The output voltage of the pressure sensor 6 is inputted to the adder 4 through the amplifier 7, and hence the pressure sensor 6 provides a control voltage Vcon which increases as the atmospheric pressure increases. Thus, as shown in FIG. 3 there is provided an atmospheric pressure vs discharge current characteristic in which the lower the atmospheric pressure is the larger the discharge current becomes. By appropriately setting the amplification degree of the amplifier 7 it is possible to make the characteristic of the system substantially in agreement with the atmospheric pressure vs optimum discharge current characteristic as shown in FIG. 4.

Thus, the automatic control such that the discharge current increases as the atmospheric pressure becomes lower is achieved, and it is, hence, not necessary to adjust the variable resistor 51 of the manual adjuster 5 when the atmospheric pressure changes.

It is to be noted that the manual adjustment of the variable resistor 51 varies the set voltage, resulting in a change in the control voltage Vcon, and hence in this manner the discharge current may be adjusted independently of the automatic control of the discharge current to the atmospheric pressure by the pressure sensor 6. This enables the discharge current to be manually adjusted when necessary due to various factors other than a variation of the atmospheric pressure, for example, a change of the kind of the optical fiber.

Figure 5:
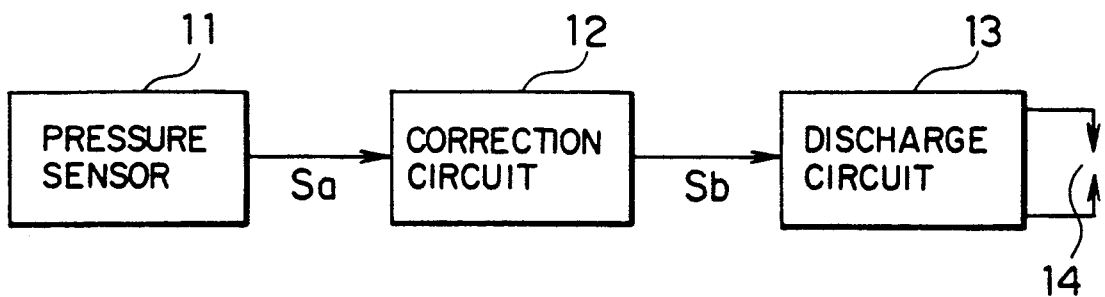
FIG. 5 is a block diagram illustrating another embodiment of the present invention.
Figure 6:
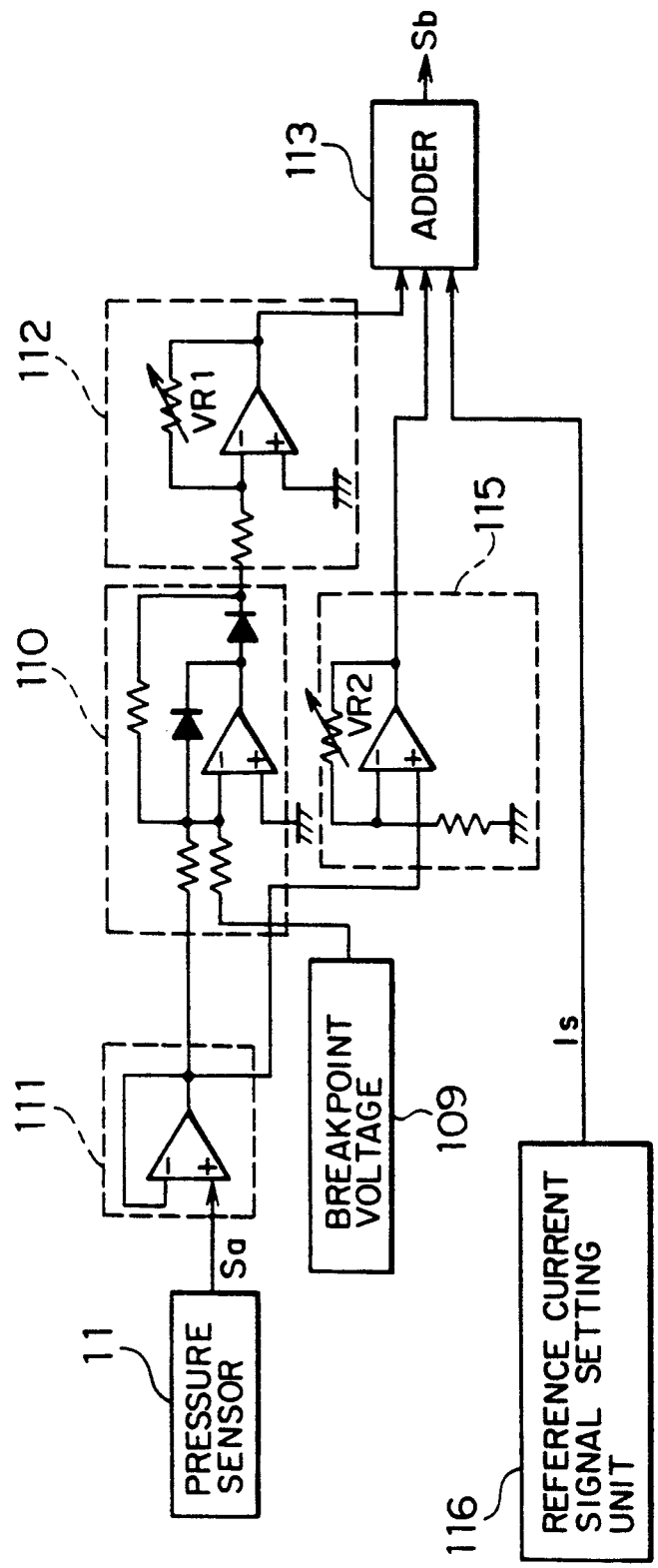
FIG. 6 is a circuit diagram showing the correction circuit in FIG. 5.
Figure 7:
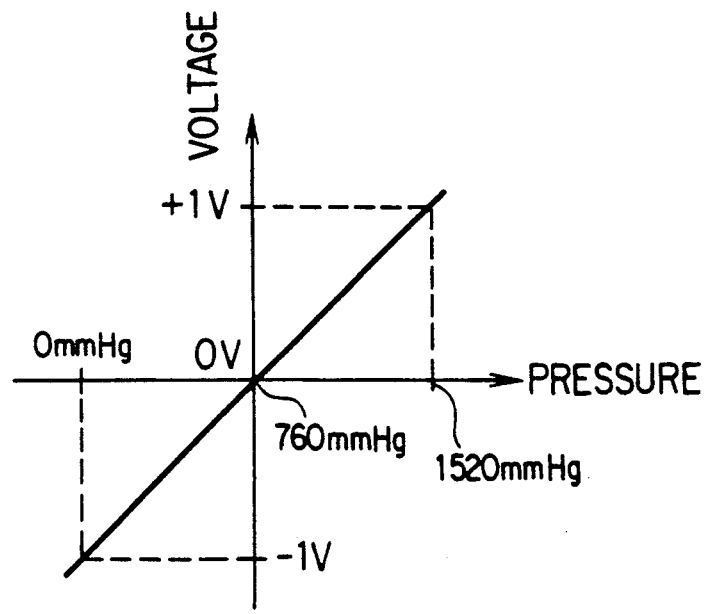
FIG. 7 is a graph showing a characteristic of the pressure sensor of FIG. 5.
Figure 8:
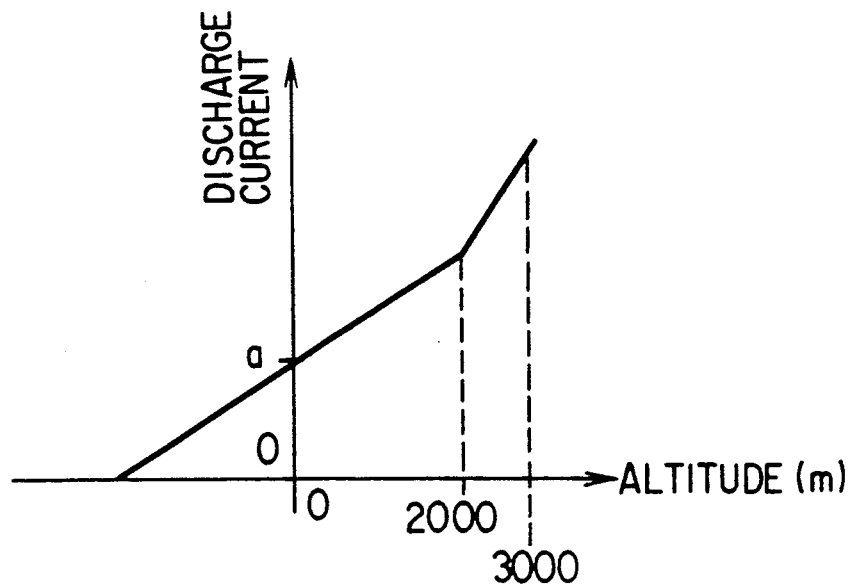
FIG. 8 is a graph illustrating an altitude vs. discharge current characteristic of the optical fiber fusion splicer of FIG. 5.

FIGS. 5 and 6 illustrate another embodiment of the present invention. In FIG. 5, reference numeral 11 designates a pressure sensor, which has a linear pressure vs voltage characteristic shown in FIG. 7. The pressure sensor 11 provides an output signal Sa representing the atmospheric pressure to a correction circuit 12, which generates a current signal Sb indicating a discharge current on the basis of the output signal Sa. The correction circuit 12 exhibits an altitude vs discharge current characteristic as plotted in FIG. 8. A discharge circuit 13 supplies a discharge current to discharge electrodes 14 on the basis of the current signal Sb.

Figure 6A:
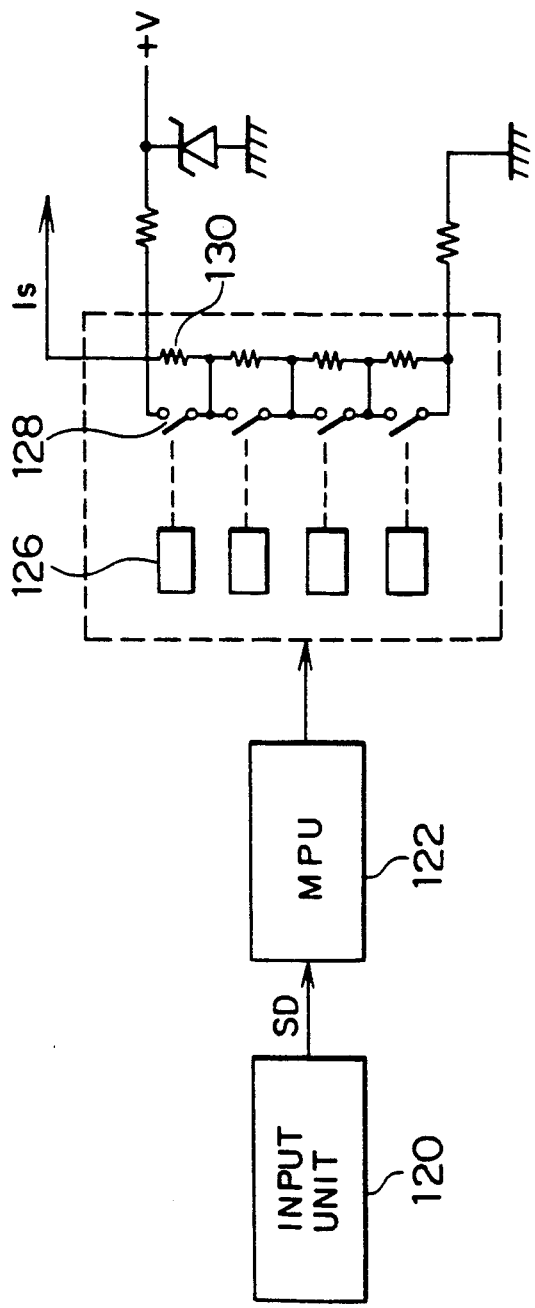
FIG. 6A shows a specific configuration of the reference current signal setting unit 116.

A specific configuration of the correction circuit 12 is illustrated in FIG. 6, in which reference numeral 110 indicates an ideal diode circuit. The ideal diode circuit 110 is provided with the output signal Sa of the pressure sensor 11 through a voltage follower 111. The ideal diode circuit 110 is also supplied from a breakpoint voltage setting unit 109 with a voltage which is set to correspond to an altitude of 2000 m. In this embodiment, the output voltage of the breakpoint voltage setting unit 109 is set so that the ideal diode circuit 110 is turned off when the altitude is below 2000 m. Although in this embodiment, a conventional constant voltage circuit is used for the breakpoint voltage setting unit 109, a resistance type voltage divider 130 (FIG. 6A) and control units 120, 122, 126, 128 may be used for selecting one of several breakpoints. The output signal of the ideal diode circuit 110 is supplied to a first input terminal of the adder circuit 113 through a inverting amplifier 112. The amplification factor $\alpha$ of the inverting amplifier 112 may be adjusted by a variable resistor VR1. The output signal of the voltage follower 111 is also fed to a second input terminal of the adder circuit 113 through a non inverting amplifier 115. The amplification factor $\beta$ of the non inverting amplifier 115 may be adjusted by a variable resistor VR2. The adder circuit 113 is provided at its third input terminal with a reference current signal Is from a reference current signal setting unit 116. The reference current signal Is is set so that the discharge current has a predetermined value (value a in FIG. 8) when the output signal Sa of the pressure sensor 11 is zero, that is, the atmospheric pressure is 760 mmHg. A specific configuration of the reference current signal setting unit 116 is illustrated in FIG. 6A. The reference current signal setting unit 116 includes an input unit 120, such as panel switches, through which set data SD for setting a reference current signal is inputted to a microprocessing unit (MPU) 122. In response to the set data SD, the MPU 122 switches a relay or relays 126, and thereby a voltage divided by a resistance type voltage divider 130 is changed by switching contacts 128. In this manner, the reference current signal Is is applied to the adder 113.

The ideal diode circuit 110 is off at an altitude below 2000 m, and in this case the adder circuit 113 adds an output signal of the non inverting amplifier 115 with the reference current signal Is to produce the current signal Sb. Thus, $$Sb = \beta \cdot Sa + Is$$

On the other hand, at or above an altitude of about 2000 m, the ideal diode circuit 110 is turned on, so that a signal $\alpha \cdot Sa$ is outputted from the output terminal of the inverting amplifier 112. In this case, the adder circuit 113 outputs the current signal Sb:

$$\begin{aligned} Sb &= \alpha \cdot Sa + \beta \cdot Sa + Is \\ &= (\alpha + \beta)Sa + Is \end{aligned}$$

This means that the inclination of the increment of the discharge current becomes much larger above 2000 m. Thus, the optical fiber fusion splicer of this embodiment achieves the characteristic of FIG. 8. This optical fiber fusion splicer suppressed the average splice loss of a single core single mode fiber not larger than 0.1 dB at about 3000 m.

The optical fiber fusion splicer of FIG. 6 is capable of automatically setting a optimum discharge current according to the atmospheric pressure, that is, the altitude.

Although in the optical fiber fusion splicer of FIG. 6, the inclination of the discharge current is changed at the altitude of 2000 m, there may be provided more than one breakpoint.

Figure 9:
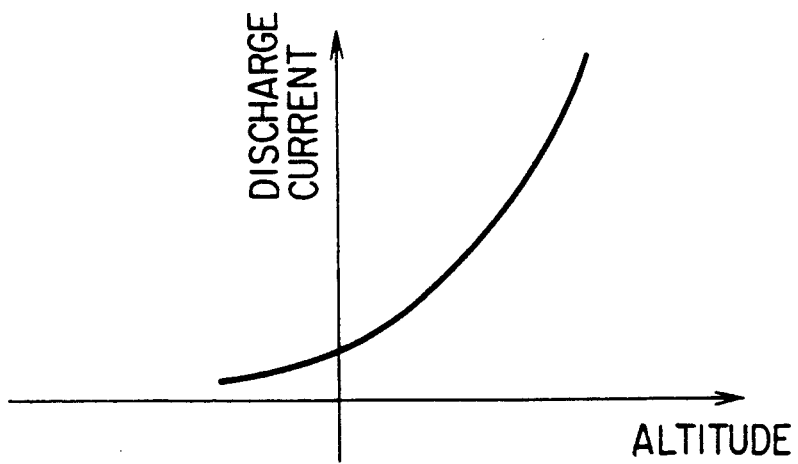
FIG. 9 is a graph illustrating an altitude vs. discharge current characteristic of a modified form of the optical fiber fusion splicer of FIG. 5.

Instead of the polygonal line characteristic, the discharge current may have a smooth nonlinear curve characteristic as illustrated in FIG. 9. To generate a predetermined nonlinear function use may be of a functional characteristic generator, utilizing nonlinear characteristics of various devices. Software processing with a microcomputer may be made also for this purpose. Also for this purpose, a pressure sensor having a nonlinear characteristic may be used.

What is claimed is:

1. An optical fiber fusion splicer comprising:
   discharge means for producing an electric discharge to fusion splice optical fibers;
   a pressure sensor for producing a pressure detection signal representing the surrounding atmospheric pressure; and
   discharge control means for controlling the discharge in response to the pressure detection signal so that a substantially optimum discharge current for the fusion splicing is provided to the discharge means, the discharge control means including:
   adjusting means for producing a discharge current adjusting signal;
   control signal generating means for generating a control signal on the basis of both the pressure detection signal and the discharge current adjusting signal; and
   discharge current control means for controlling the discharge current in response to the control signal.

2. An optical fiber fusion splicer as recited in claim 1, wherein the discharge control means comprises nonlinear characteristic providing means for providing a substantially optimum nonlinear characteristic to the discharge current in relation to the atmospheric pressure.

3. An optical fiber fusion splicer as recited in claim 2, wherein:
   nonlinear characteristic providing means is adapted to produce a nonlinear signal representing the nonlinear characteristic; and
   the control signal generating means is adapted to generate the control signal on the basis of the pressure detection signal, the discharge current adjusting signal, and the nonlinear signal.

4. An optical fiber fusion splicer as recited in claim 3, wherein the optimum nonlinear characteristic is defined by a broken line.

5. An optical fiber fusion splicer as recited in claim 3, wherein the optimum nonlinear characteristic is defined by a smooth nonlinear curve.

* * * * *